United States Patent
Thomas et al.

[15] 3,651,699
[45] Mar. 28, 1972

[54] VEHICLE WINDSCREEN WIPING MECHANISMS

[72] Inventors: David Thomas, Solihull; James Barry Seager, both of Birmingham, England

[73] Assignee: Joseph Lucas (Industries) Limited, Birmingham, England

[22] Filed: Oct. 28, 1969

[21] Appl. No.: 871,878

[30] Foreign Application Priority Data

Dec. 13, 1968 Great Britain......................59,423/68

[52] U.S. Cl..................................74/109, 74/660, 15/250.3
[51] Int. Cl...........................................................F16h 21/44
[58] Field of Search...................74/109, 422, 660; 15/250.3, 15/250.13, 250.21

[56] References Cited

UNITED STATES PATENTS 3,554,363   1/1971   Elineau....................................74/660

FOREIGN PATENTS OR APPLICATIONS 676,438   6/1929   France..................................15/250.3

*Primary Examiner*—Edgar W. Geoghegan
*Assistant Examiner*—Ronald H. Lazarus
*Attorney*—Holman & Stern

[57] ABSTRACT

A mechanism for controlling the operating cycle of a wiper blade for cleaning a vehicle window comprises an arm rotatably mounted on a drive member whereby it can be reciprocated, a wiper blade carrier pivotally mounted at the outer end of the arm and means for rotating the blade carrier relatively to the arm as the arm is rotated, so that a blade on the blade carrier follows an elliptical path to sweep a large area of glass.

2 Claims, 1 Drawing Figure

PATENTED MAR 28 1972
3,651,699
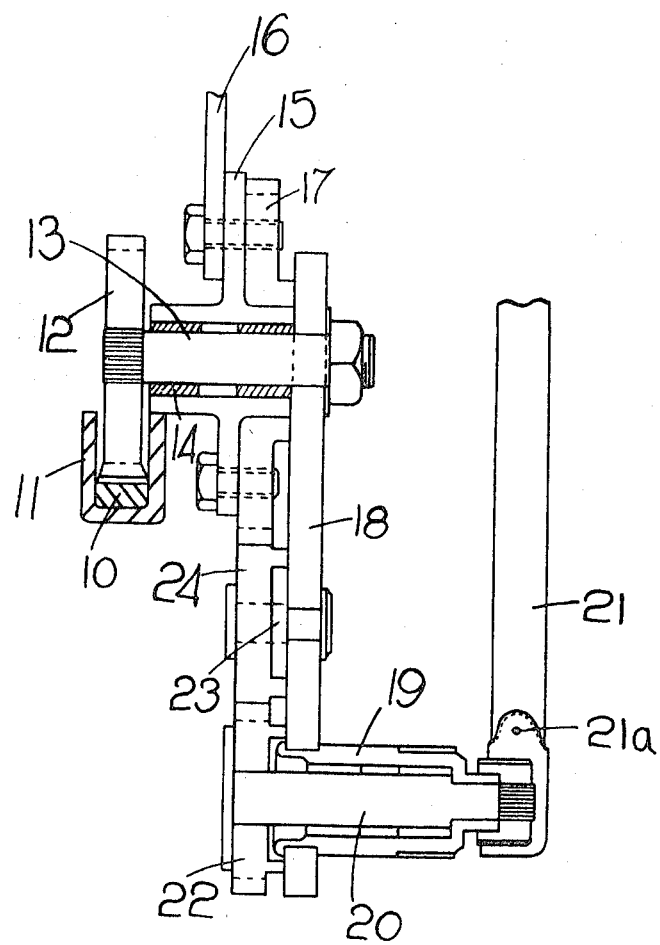
INVENTOR
David Thomas + James Barry Seager
BY Holman, Glascock,
Downing + Seebold
ATTORNEYS

VEHICLE WINDSCREEN WIPING MECHANISMS

This invention relates to mechanisms for controlling the operating cycle of wiper blades for cleaning vehicle windows.

The object of the invention is to provide a mechanism for this purpose which enables maximum area of the glass to be cleaned.

According to the present invention a mechanism for controlling the operating cycle of a wiper blade for cleaning a vehicle window comprises an angularly movable drive member, means for rotating the drive member in one direction and then reversing it, during the operating cycle, an arm fixed to said drive member, said arm extending laterally of the axis of rotation of the drive member, a blade carrier rotatably mounted on the outer end of the arm, and means for rotating the blade carrier relatively to the arm as the drive member and arm are moved angularly, the arrangement being such that as the arm moves through a predetermined cycle, the blade carrier will move angularly relatively to the arm.

The invention will now be described by way of example with reference to the accompanying drawing, the single figure of which shows, in cross-section, a mechanism constructed in accordance with the invention.

The mechanism illustrated is intended for use for controlling the operating cycle of a vehicle windscreen wiper and it comprises a rack 10 which is reciprocated by mechanism (not shown) connected to an electrical motor. This motor is preferably of the reversible type. The rack is guided in a channel-forming part 11, secured onto the vehicle and extending generally parallel with respect to one edge (for example the lower edge) of the windscreen to be cleaned.

Engaging with the rack 10 is a pinion 12 carried on a shaft 13, mounted in bearings 14, carried by a member 15 on a fixed part 16, of the vehicle. Secured by bolts to the member 15 is a fixed gear 17.

Carried at the opposite end of the shaft 13 from the pinion 12 is an arm 18. At the free end of the arm 18 there is mounted a sleeve 19 within which is journaled a spindle 20 having a spline at one end which engages with a blade carrier 21. To the blade carrier 21 is fixed a blade (not shown) for engagement with the glass surface, and there is pivotal connection between the portion of the blade carrier engaged with the spline on the spindle 20, and that portion which carries the blade, the axis 21a of such pivotal connection being parallel to the glass surface.

To the other end of the spindle 20 from the spline, which engages the blade carrier 21, there is fixed a pinion 22. Intermediate the ends of the arm 18 there is a short shaft 23 on which is journaled a further pinion 24 meshing with the pinion 22 and also with the fixed gear 17.

The arrangement is such that as the rack 10 is reciprocated, the gear 12 and arm 18 are moved angularly. As such angular movement of the arm takes place, the meshing of the pinions 22, 24 and the gear 17 causes the spindle 20 to be rotated so that the blade carrier 21 is moved angularly about the axis of the spindle 20, as well as being moved bodily about the axis of the shaft 13.

In the mechanism illustrated, the pinion 12 moves through 360° in alternate directions, and the blade carrier moves through 180° about the axis of the spindle 20.

The relative sizes of the gear 17 and pinion 22 determine the angular movement of the blade carrier in relation to the arm 18.

Having thus described our invention what we claim as new and desire to secure by Letters Patent is

1. A mechanism for controlling the operating cycle of a wiper blade for cleaning a vehicle window comprising an angularly movable drive member, drive means for rotating the drive member in one direction and then reversing it, during the operating cycle, an arm fixed through said drive member, said arm extending laterally of the axis of rotation of the drive member so as to move angularly about said axis, a blade carrier rotatably mounted through a spindle on the outer end of the arm, and means for rotating the blade carrier relatively to the arm, said means comprising a spindle pivotally mounted on the outer end of the arm, the blade carrier being fixed to the spindle, the rotational axes of the drive member and the spindle being parallel, a pinion also fixed to the spindle, a fixed pinion relatively to which the drive member is rotatable, and a further pinion pivotally mounted on the arm and meshing with the pinion on the spindle and also the fixed pinion, the mechanism being movable by said means through a predetermined cycle so that the blade carrier moves through a part elliptical path relatively to said arm.

2. A mechanism as claimed in claim 1 in which the drive member is rotatable by a rack and pinion mechanism.

* * * * *